United States Patent

Djokic et al.

[11] Patent Number: 5,945,158
[45] Date of Patent: Aug. 31, 1999

[54] PROCESS FOR THE PRODUCTION OF SILVER COATED PARTICLES

[75] Inventors: Stojan Djokic, Edmonton; Maurice Dubois; Ross H Lepard, both of Fort Saskatchewan, all of Canada

[73] Assignee: N.V. Union Miniere S.A., Brussels, Belgium

[21] Appl. No.: 08/891,755

[22] Filed: Jul. 14, 1997

Related U.S. Application Data

[63] Continuation of application No. 08/585,818, Jan. 16, 1996, abandoned.

[51] Int. Cl.⁶ .................. B05D 7/14; B05D 1/18
[52] U.S. Cl. .................. 427/216; 427/217; 427/405; 427/437; 428/403
[58] Field of Search ........................ 427/216, 217, 427/405, 437; 428/403

[56] References Cited

U.S. PATENT DOCUMENTS

| | | | |
|---|---|---|---|
| 4,309,457 | 1/1982 | Kawasumi et al. | 427/214 |
| 4,652,465 | 3/1987 | Koto et al. | 427/216 |
| 4,888,216 | 12/1989 | Sannohe et al. | 427/216 |
| 5,178,909 | 1/1993 | Hayashi | 427/216 |

FOREIGN PATENT DOCUMENTS

| | | |
|---|---|---|
| 1295952 | 5/1969 | Germany . |
| 53134759 | 1/1993 | Japan . |
| 72003019 | 8/1993 | Japan . |

*Primary Examiner*—Shrive Beck
*Assistant Examiner*—Bret Chen
*Attorney, Agent, or Firm*—Arne I. Fors

[57] ABSTRACT

A process for the preparation of silver coated particles useful as polymer fillers is provided. Copper coated, or copper particles are dispersed in an alkaline ammoniacal solution to remove impurities and activate the surfaces thereof. A combined completing and reducing agent is added. Finally, a solution containing silver ions is used to coat the particles with a uniform layer of silver.

5 Claims, 3 Drawing Sheets

PROCESS FOR THE PRODUCTION OF SILVER COATED PARTICLES

This application is a Continuation of application Ser. No. 08/585,818 filed Jan. 16, 1996 (now abandoned).

FIELD OF THE INVENTION

The present invention relates to a process for the preparation of silver coated particles. More specifically, the invention involves silver covered copper, or copper coated, particles.

BACKGROUND OF THE INVENTION

Metal particles which find utility as electrically and thermally conductive fillers for polymeric materials typically comprise gold, silver, copper, nickel or aluminium. Gold and silver whilst possessing excellent conductivity properties are, however, expensive. Nickel and copper display, initially, good electrical conductivities but deleteriously are susceptible to oxidation with the concomitant diminution of desirable properties such as quality and stability.

In order to overcome the problems associated with nickel and copper, namely oxidation, or the high cost of using silver, the substitution by silver coated copper particles for solid silver particles has been contemplated and methods for the production thereof explored.

In Japanese Patent Publication No. 3019 there is disclosed a method for the electroless deposition of silver on copper particles which deleteriously involves the use of potentially environmentally hazardous sodium cyanide solution.

A method for the precipitation of silver on copper powder using silver nitrate, ammonium bicarbonate and sodium ethylenediamine tetracetic acid (EDTA) is disclosed in Japanese Publication No. 59283. Although exhibiting acceptable electrical conductivity, the produced silver coated copper powder was susceptible to the effects of humidity and consequently, its oxidative stability failed to meet accepted tolerances.

Koto et al. in U.S. Pat. No. 4,652,465 describe a method for producing silver coated copper powder by initially forming a silver complex solution from a silver salt, ammonium carbonate or bicarbonate and ammonium hydroxide. The copper powder is then contacted with the silver complex solution to thereby precipitate metallic silver upon the copper particles. Whilst the method described is advantageously applicable to the use of any silver salt, the problem inherent therein resides in its ability to effect only partial coverage of silver on the copper particles.

U.S. Pat. No. 5,178,909 issued to T. Hayashi teaches the preparation of silver coated copper-based powders involving the steps of dispersing copper powders in a chelating agent solution, for example EDTA, adding a silver ion solution to the resultant dispersion to effect a substitution type of deposition reaction. This is followed by the addition of a reducing agent to obtain a reduction type of deposition reaction to thereby form silver coats on the copper powders. The chelating agent may be added in two or three portions, namely prior to the addition of the silver ion and with the addition of the silver ion and with the addition of the reducing agent or as just described but with further addition at the time of completion of the reaction. The major disadvantage of this process lies in the lack of uniform distribution of silver on the copper-based powders.

The disadvantages associated with all of the prior art processes described supra are their inability to produce silver coated copper or, copper-based, powders having uniform thickness or integral silver coverage thereof.

SUMMARY OF THE INVENTION

As its main objectives, the invention aims to provide uniformly coated silver covered copper, or copper coated, particles without the formation of agglomerates and/or silver fines. A further objective is to provide a rapid process for the preparation of such particles which involves fewer steps than the prior art processes and which is non-toxic to both personnel operating the process and to the environment.

In accordance with the present invention there is provided a process for the preparation of silver coated particles which comprises: dispersing copper, or copper coated, particles in an alkaline ammoniacal solution to remove impurities thereon and activate the surfaces thereof; adding a combined complexing and reducing agent to the alkaline ammoniacal particle containing slurry; and adding a solution containing silver ions to thereby coat said copper, or copper coated, particles with a uniform layer of silver.

More specifically, the preferred reagents would consist of an ammoniacal ammonium sulphate solution as the cleaning and activating agent for the copper, or copper coated, particles. The preferred reactant functional to act as both a reducing and complexing agent is sodium potassium tartrate. Preferably, the silver ion-containing solution would comprise an alkaline silver nitrate solution.

Without being bound by same, it is believed that it is in the utilization of a single reactant which is functional to act as both a complexing and reducing agent that it is possible to obtain uniform silver coverage of the copper, or copper coated, particles without incurring the formation of agglomerates or the precipitation of silver fines.

In accordance with a second broad aspect there is provided silver covered, copper coated particles comprising a substrate selected from glass, or a ceramic, or a metal or graphite having a layer copper deposited thereon, said copper layer being between one to fifty weight percent and a substantially uniform, integral silver coating thereover said silver coating being between about one to fifty weight percent.

An important facet of the invention resides in the process for the production of the silver covered copper coated particles. Whilst the substrate particles may comprise certain metals such as nickel, iron, cobalt, aluminium, silicon, tungsten or any other suitable metal, or glass particles, or graphite particles, or ceramic particles exemplary of which would be alumina or zirconia, it is by applying an initial copper coating thereover, that it is possible to subsequently obtain the desired coverage of silver thereon.

Thus, in providing this variety of silver coated particles the products of the invention may be expanded to provide particles having an extended range of properties whilst retaining good electrical conductivity properties and good oxidation resistance properties. Products, which in addition to the forementioned properties, possess good magnetic properties would include silver covered copper coated nickel, iron or other suitable metal particles. Alternatively, with silver covered copper coated particles wherein the substrate comprises for example, glass, a ceramic or carbon, the products may be used in fillers requiring good electrical conductivity, oxidation resistance and low density. Furthermore, should fillers additionally be required to exhibit good hardness characteristics, the substrate may be selected from a suitable material such a tungsten carbide, tungsten or the like.

It is to be noted, that it is essential to provide the copper coating on any substrate in order to effect the application of uniform, integral silver coverage thereof. The preferred method of coating the substrate with copper would include using an electroless deposition technique. However, electrodeposition methods in the case of metals, or other techniques may be utilized and would be easily determined by one skilled in the art.

DESCRIPTION OF THE DRAWINGS

The process and products of the invention will now be described having reference to the accompanying figures in which.

DESCRIPTION OF THE PREFERRED EMBODIMENT

Figure 1:
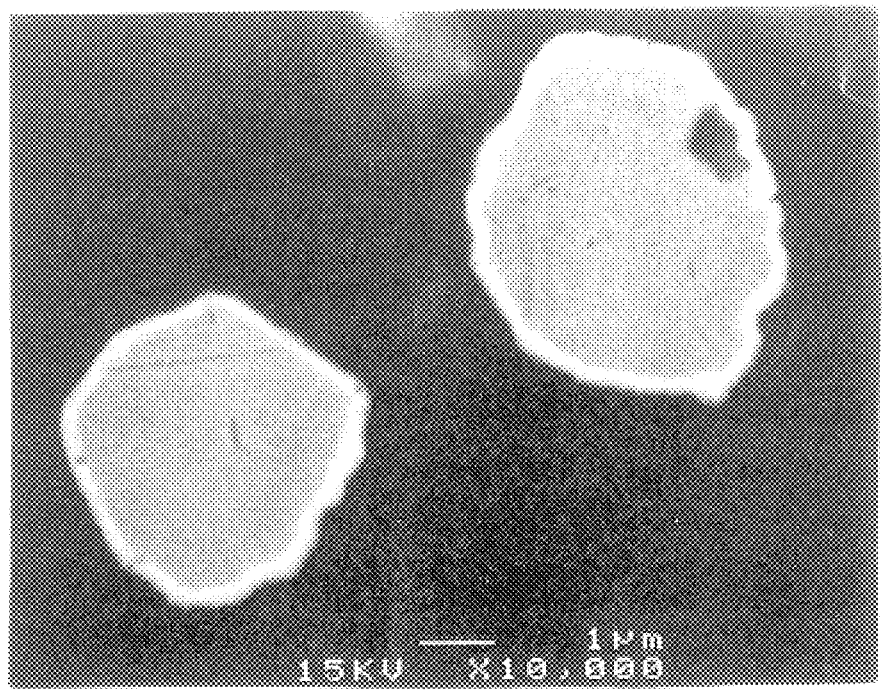
FIG. 1 is a photomicrograph taken at a magnification of 10,000× illustrating cross-sectional views of silver coated copper particles.
Figure 2:
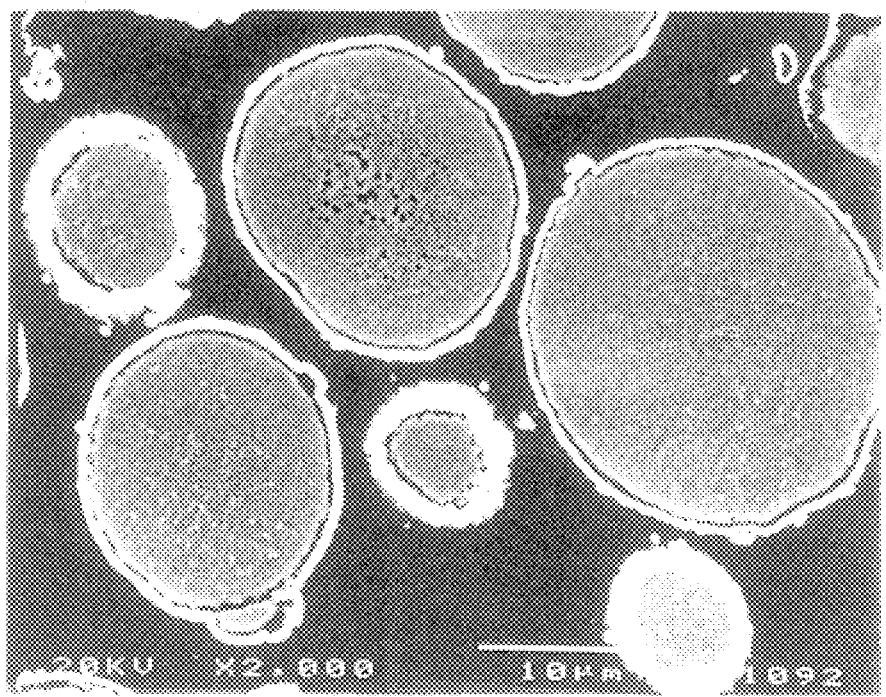
FIG. 2 is a photomicrograph taken at a magnification of 2,000× showing cross-sectional views of silver coated copper coated nickel particles. The uniform silver coating 12, and nickel core 14 can be clearly distinguished.
Figure 3:
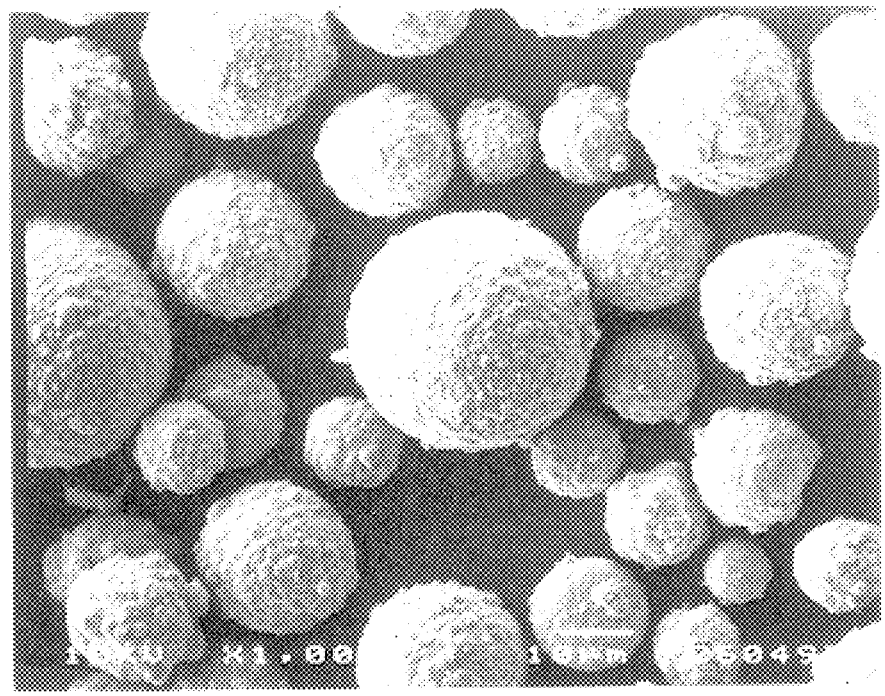
FIG. 3 is a photomicrograph taken at a magnification of 1,000× depicting silver coated copper powder particles.
Figure 4:
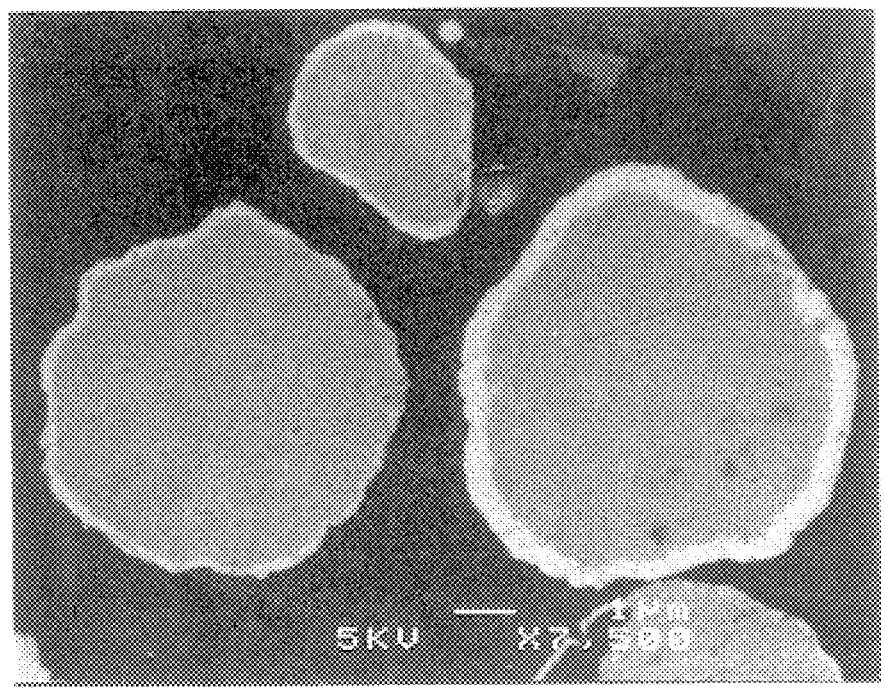
FIG. 4 is a photomicrograph taken at a magnification of 7,5000× showing cross-sectional views of silver coated copper powder particles.

The process of the present invention provides a method of producing silver covered copper, or copper coated, particles. Initially, the copper coated, or copper, particles, are dispersed in an alkaline ammonium salt solution to activate the particle surfaces and remove impurities, or formed copper oxides therefrom. A reducing agent solution, preferably a solution of sodium potassium tartrate, is then added in a sufficient quantity to thereby complex copper ions formed during the activation step, and subsequently reduce the silver ions. A stoichiometric amount of a silver ion-containing solution is added to effect a combined displacement/deposition reaction which because of the presence of the reducing agent is functional to uniformly coat silver onto the copper, or copper coated, particles.

The copper particles per se may be particles of any origin, namely electrolytically produced particles, particles prepared by chemical reduction, atomized particles, mechanically produced particles or the like. By particles is meant any shape including for example dendritic, spherical, flaky or granular. Particle sizes would typically range from between about one to fifty microns. The term 'copper particles' would also be understood to include hollow copper spheres or the like.

The copper coated particles may comprise copper coated metal particles such as nickel, iron, cobalt, aluminium, silicon, tungsten or any metal having suitable properties. Alternatively, the copper coated particles may be copper coated glass, ceramic, graphite or any other suitable substrate. Suitable ceramic substrates, or cores, would include alumina, aluminium nitride, beryllia, tungsten carbide, silicon carbide or zirconia. The substrate size would range from about one to fifty microns. The amount of copper deposited would range between one to fifty weight percent.

Deposition of copper on the substrate may be effected by conventional electroless plating techniques, namely using a bath containing an alkaline solution of copper sulphate, Rochelle salt, potassium hydroxide and formaldehyde. Other suitable deposition techniques can be readily resolved by one skilled in the art.

The alkaline ammonium salt solution used to clean and activate the copper surface is ammoniacal ammonium carbonate, ammonium bicarbonate or ammonium sulphate solution. Ammonium sulphate is the preferred salt providing the best coverage of the copper surface and the fastest rate of silver deposition. Typical concentrations of the reagents would comprise 0.4 to 0.6 mole/dm$^3$. This step involves flash exposure at ambient temperature.

The copper powder, or copper coating, dissolves in the ammoniacal ammonium salt solution to provide a clean surface which is receptive to the deposition of silver thereon. The quantity of ammonia controls the rate of copper dissolution, and thus it has been determined that the ratio of ammonia to ammonium sulphate should be less than four to one.

The formulae for the dissolution reaction of surface oxides and hydroxides as detailed supra are as follows:

$$Cu_2O + 2NH_4OH + (NH_4)_2SO_4 = [Cu(NH_3)_2]_2SO_4 + 3H_2O$$

$$CuO + 2NH_4OH + (NH_4)_2SO_4 = [Cu(NH_3)_4]SO_4 + 3H_2O$$

$$Cu(OH)_2 + 2NH_4OH + (NH_4)_2SO_4 = [Cu(NH_3)_4]SO_4 + 4H_2O$$

The reaction for the dissolution of the surface layer of copper metal is:

$$Cu + 0.5O_2 + 2NH_4OH + (NH_4)_2SO_4 = [Cu(NH_3)_4]SO_4 + 3H_2O$$

Under these conditions wherein the copper surface is clean and activated, the displacement reaction takes place rapidly. In order to suppress precipitation of copper hydroxides it is necessary to add a $Cu^{2+}$ ion complexing agent. Sodium potassium tartrate is used and functions as both a complexing agent for the $Cu^{2+}$ ions and subsequently as a mild reducing agent of the silver ions.

The concentration of sodium potassium tartrate must be sufficient to complex the $Cu^{2+}$ ions and bring about the reduction of silver ions. In order to produce a uniform silver coating the minimum quantity of sodium potassium tartrate must be at least 65 g per 100 g of copper powder.

An identical amount is required for copper coated particles. It was observed that the copper-tartrate complexes are stable under reaction conditions even when the pH is reduced to seven during subsequent processing.

The silver ion solution is a freshly prepared aqueous solution of silver nitrate and ammonium hydroxide in the molar ratio of 1:3. The dissolution of silver nitrate in ammonium hydroxide is given in the following equations:

$$2AgNO_3 + 2NH_4OH = Ag_2O + 2NH_4NO_3 + H_2O$$

$$Ag_2O + 4NH_4OH = 2[Ag(NH_3)_2]OH + 3H_2O$$

$$[Ag(NH_3)_2]OH + NH_4NO_3 = [Ag(NH_3)_2]NO_3 + NH_4OH$$

The amount of silver required in the silver ion solution is dependent upon particle size, the amount of silver decreasing with increasing particle size. The amount of silver required for copper, or copper coated particle sizes ranging between one and six microns would be 50 to 20 weight percent, and 20 to 0.1 weight percent for particle sizes ranging from 6 to 50 microns.

When the silver ion solution is added to the slurry of copper, or copper coated, particles in the ammoniacal sulphate solution plus reducing agent solution the following displacement reaction takes place at the active copper surface:

$$Cu+2[Ag(NH_3)_2]NO_3=[Cu(NH_3)_4](NO_3)_2+2Ag$$

Once a monolayer of silver has formed on the surface of the copper, or copper coated, particles the silver is reduced by the tartrate with concomitant silver layer build up onto the silver monolayer. The following reactions are postulated:

$$2Ag(NH_3)_2^+ + 2OH^- = Ag_2O + 4NH_3 + H_2O$$

$$3Ag_2O + C_4H_4O_6^{2-} + 2OH^- = 6Ag + 2C_2O_4^{2-} + 3H_2O$$

The reaction is carried out at ambient temperature. The total time required for the process is about fifteen minutes, the reduction being complete within five minutes.

Figure 5:
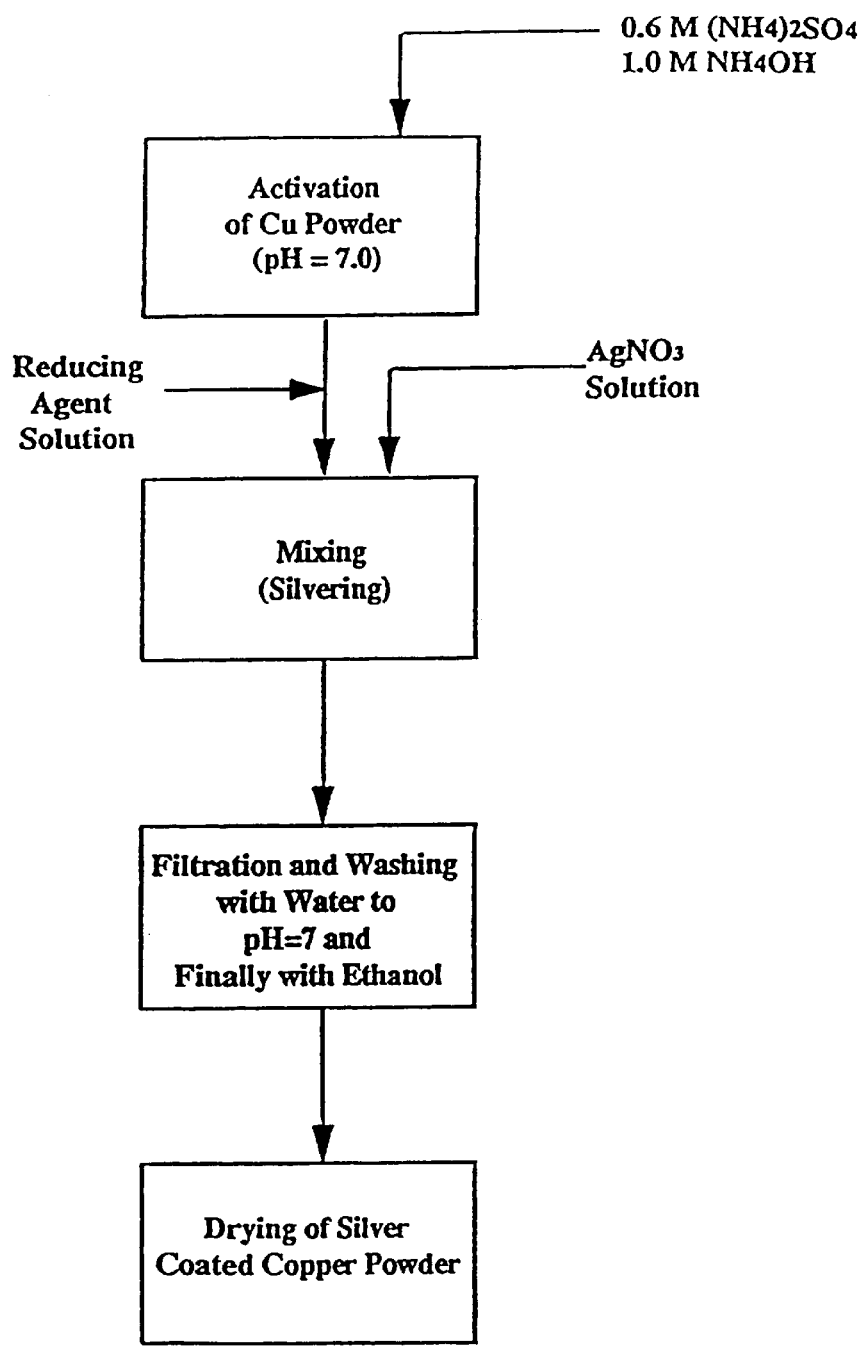
FIG. 5 is a schematic of the process of the invention.

The solution is decanted, and the powder is filtered and washed with deionized water to pH 7 and finally dried at 105° C. in accordance with the schematic of FIG. 5. It was observed that in the residual solution after separation all the silver had been deposited, thus demonstrating a deposition efficiency of close to 100%.

The products and process of the invention will now be described with reference to the following non-limitative examples.

EXAMPLE I 100 g of 6 micron sized copper particles were added to approximately 350 mL of a 0.5M ammonium sulphate and 1.0M ammonium hydroxide solution. The slurry was stirred at 600 RPM for two minutes. 150 mL of a solution containing 400 g/L sodium potassium tartrate was added to the slurry and stirred for 3 to 5 minutes. 320 mL of an aqueous solution containing 28 g of silver nitrate and 26 mL of 28 volume % ammonium hydroxide was then added dropwise. After the silvering process was complete, in about ten minutes, the solids were separated, washed, filtered and dried. The final product comprising silver coated particles contained approximately 18 wt. % silver.

In order to measure the surface resistivity of the product, 30 g of the silver covered copper particles were mixed into a paste using ethyl cellulose and terpinol. The samples were screen printed and dried in air for ten minutes. The surface resistivity of the coating layer thus obtained having a thickness of 50 microns was 50 mΩ/sq. No significant changes in surface resistivities were observed after the sample was left in a constant humidity chamber at 70° C. under a relative humidity of 93% for 21 days.

EXAMPLE II 100 g of copper flake having an average particle size between 10 to 15 microns were treated as described hereabove. A uniform coating of silver was observed.

EXAMPLE III 100 g of atomized copper powder, manufactured by Alcan, having an average particle size of 20 microns was treated as described in Example I using instead a silver ion solution containing 8 g silver nitrate and 8 mL of 28% ammonium hydroxide. The final product contained 5.3 wt. % silver. The silver coating was observed by scanning electron microscope to be uniformly deposited. The surface resistivity of a polymer filled with the silver coated copper powder was found to be between 50 and 60 m Ω/sq. The resistivity did not change after 21 days in a humidity cabinet.

EXAMPLE IV 100 g of copper powder having an average particle size of 50 microns was treated as in Example I. The silver ion solution comprised 0.2 g silver nitrate and 0.4 mL of 28 volume % ammonium hydroxide. The final product contained approximately 0.15 wt. % Ag. Again the silver coating obtained was uniformly distributed having a resistivity of 60 mΩ/sq.

EXAMPLE V

Spherical nickel powder, produced by the assignee of the instant invention, having an average particle size of 20 microns was exposed to a 10 to 20% aqueous solution of HCl at 25° C. with agitation to activate the nickel surface. After washing to pH 7 with deionized water, the nickel was treated as in Example III. However, the silver coated nickel powder did not display uniform silver coating. Furthermore, there was evidence of the presence of silver fines together with the formation of agglomerates. Surface resistivity was found to be poor and the samples lacked durability.

EXAMPLE VI 100 g of nickel powder having a particle size of 20 microns was exposed in a 10 to 20% aqueous solution of HCl at room temperature and then washed with deionized water until the pH reached 7. The copper was electrolessly deposited onto the nickel powder using a bath containing 300 mL of a solution formulated of 68 g/L sodium potassium tartrate, 20 g/L sodium hydroxide, 14 g/L copper sulphate and 12 g/L sodium carbonate and 40 to 60 mL of a 37% aqueous formaldehyde solution. The plating was carrried out at 30–40° C. with agitation. The copper coated nickel powder was then treated as described in Example III following a deionized water wash to pH 7. The silver covered, copper coated nickel powder showed uniform distribution of the silver onto the nickel powder with good surface resistivity and durability properties.

EXAMPLE VII 100 g of 20 micron sized tungsten powder was treated as detailed in Example VI. Again, uniform silver distribution, good surface resistivity properties and stability were observed.

EXAMPLE VIII 50 g of 20 micron sized glass particles were degreased in an alkaline solution of 30 g/L sodium carbonate and 12 g/L sodium phosphate for three minutes. After washing with deionized water, the glass particles were treated, with agitation, with a solution containing 20 g/L stannous chloride and 50 g/L hydrochloric acid for one minute. The particles were again washed with water, and agitated with a solution containing 4 g/L palladium chloride and 50 g/L hydrochloric acid. After washing with water, the particles were subjected to electroless copper deposition, and silver deposition as described hereabove. The silver coated particles had good resistivity and durability properties.

The embodiments in which an exclusive property or privilege are claimed are defined as follows:

1. A process for the preparation of silver coated particles which comprises the following sequential steps:

dispersing copper, or copper coated, particles in an alkaline ammoniacal ammonium sulphate solution for a period of time ranging from about 0.25 to about 3 minutes to remove impurities thereon and to activate the surfaces thereof;

adding sodium potassium tartrate as a combined complexing and reducing agent to the alkaline ammoniacal, particle containing slurry and mixing for a period time of between 3 to 5 minutes; and adding a solution containing silver ions to thereby coat said copper, or copper coated, particles with a substantially continuous layer of silver having substantially uniform thickness.

2. A process as set forth in claim 1 wherein said copper coated particles are copper coated glass particles; copper coated ceramic particles, said ceramics being selected from the group consisting of alumina, aluminium nitride, beryllia, tungsten carbide, silicon carbide, and zirconia; copper coated metal particles selected from the group consisting of copper coated nickel, copper coated iron, copper coated silicon, copper coated tungsten, copper coated cobalt and copper coated aluminium; copper coated polymeric particles; or copper coated graphite particles.

3. The process as set forth in claim 2 wherein said copper coating is between one to 50 weight percent of the copper coated particles and said silver coating is between 50 to 20 weight percent of the silver coated, copper coated particles for particle sizes between one and six microns and between 20 to 0.1 weight percent of the silver coated, copper coated particles for particle sizes ranging from six to 50 microns.

4. A process as set forth in claim 1 wherein said copper coated particles are copper coated glass particles; copper coated ceramic particles, said ceramics being selected from the group consisting of alumina, aluminium nitride, beryllia, tungsten carbide, silicon carbide, and zirconia; copper coated metal particles selected from the group consisting of copper coated nickel, copper coated iron, copper coated silicon, copper coated tungsten, copper coated cobalt and copper coated aluminium; copper coated polymeric particles, and copper coated graphite particles; and said silver ion containing solution is an aqueous solution of sodium hydroxide and silver nitrate in admixture.

5. The process as set forth in claims 1 or 4 further comprising separating the silver coated particles, washing, and drying the silver coated particles to thereby obtain a final product.

\* \* \* \* \*